United States Patent
Lazaridis et al.

(10) Patent No.: US 6,691,111 B2
(45) Date of Patent: Feb. 10, 2004

(54) SYSTEM AND METHOD FOR IMPLEMENTING A NATURAL LANGUAGE USER INTERFACE

(75) Inventors: Mihal Lazaridis, Waterloo (CA); Michael Brown, Heidelberg (CA)

(73) Assignee: Research In Motion Limited, Waterloo ( * ) Notice: Subject to any disclaimer, the term of this patent is extended or adjusted under 35 U.S.C. 154(b) by 329 days.

(21) Appl. No.: 09/880,216

(22) Filed: Jun. 13, 2001

(65) Prior Publication Data

US 2002/0002453 A1 Jan. 3, 2002

Related U.S. Application Data

(60) Provisional application No. 60/215,222, filed on Jun. 30, 2000.

(51) Int. Cl.[7] .............................................. G06F 17/30
(52) U.S. Cl. ................................................. 707/6; 707/3
(58) Field of Search ............................... 707/6, 1, 2, 3, 707/10, 5, 100, 101, 103, 4, 202; 704/275, 270, 251; 703/252

(56) References Cited

U.S. PATENT DOCUMENTS

| | | | | | |
|---|---|---|---|---|---|
| 5,974,413 A | * | 10/1999 | Beauregard et al. | ........... | 707/6 |
| 6,292,794 B1 | * | 9/2001 | Cecchini et al. | ............... | 707/3 |
| 6,438,545 B1 | * | 8/2002 | Beauregard et al. | ........... | 707/6 |

* cited by examiner

*Primary Examiner*—Sanjiv Shah
(74) *Attorney, Agent, or Firm*—Jones Day; Krishna K. Pathiyal; Charles B. Meyer

(57) ABSTRACT

A system and method for implementing a natural language user interface includes a plurality of software applications, a means for entering text, and a natural language search engine. The natural language search engine is configured to receive an abbreviated textual command from the text entering means, match the abbreviated textual command with a desired application command, and launch one of the software applications by executing the desired application command.

49 Claims, 5 Drawing Sheets

| APPLICATION COMMAND | APPLICATION TAG |
|---|---|
| E-mail | names, e-mail addresses |
| Compose | names, e-mail addresses |
| Calendar | month, day, time |
| Appointment | month, day, time, place, name |
| Address | names, company, e-mail |
| Task | date, names, misc..... |
| View Messages | names, dates |

*Fig. 5*

| USER INPUT | USER COMMAND | PROBABILITY FACTOR |
|---|---|---|
| e_j | e-mail John | 0.8 |
|  | e-mail Jane | 0.2 |
| e_k | e-mail Krishna | 0.9 |
|  | e-mail Kathy | 0.1 |
| e_ | e-mail | 1.0 |
| c_ | calendar | 1.0 |
| a_ | address book | 1.0 |

SYSTEM AND METHOD FOR IMPLEMENTING A NATURAL LANGUAGE USER INTERFACE

CROSS-REFERENCE TO RELATED APPLICATION

This application claims priority from and is related to the following prior application: Natural Language User Interface, United States Provisional Application No. 60/215,222, filed on Jun. 30, 2000. This prior application, including the entire written description and drawing figures, is hereby incorporated into the present application by reference.

BACKGROUND

1. Field of the Invention

This invention generally relates to user interfaces. More particularly, the invention provides a system and method for accessing software applications with limited user input. The invention is particularly well-suited for use in Personal Digital Assistants, mobile communication devices, cellular phones, and wireless two-way e-mail communication devices (collectively referred to hereinafter as "hand-held devices"). The invention provides utility, however, in any device which requires a user interface.

2. Description of the Related Art

In traditional hand-held devices, a typical user interface is graphical in nature. An example of a known graphical user interface 10 is shown in FIG. 1. The known graphical user interface 10 requires a user to scroll through a ribbon of icons, and select the desired application by "clicking" on the icon associated with it. Once in an application, the user cannot open a second application without (a) exiting the application, (b) returning to the graphical user interface 10, and (c) selecting an icon associated with the second application.

SUMMARY

A system and method are provided for implementing a natural language user interface. The system includes a plurality of software applications, a means for entering text, and a natural language search engine. The natural language search engine is configured to receive an abbreviated textual command from the text entering means, match the abbreviated textual command with a desired application command, and launch one of the software applications by executing the desired application command.

BRIEF DESCRIPTION OF THE DRAWINGS

FIG. 5 is a table illustrating exemplary application commands and exemplary associated application tags;

FIG. 7 shows an exemplary data set stored in a natural language database; and

DETAILED DESCRIPTION

Figure 2:
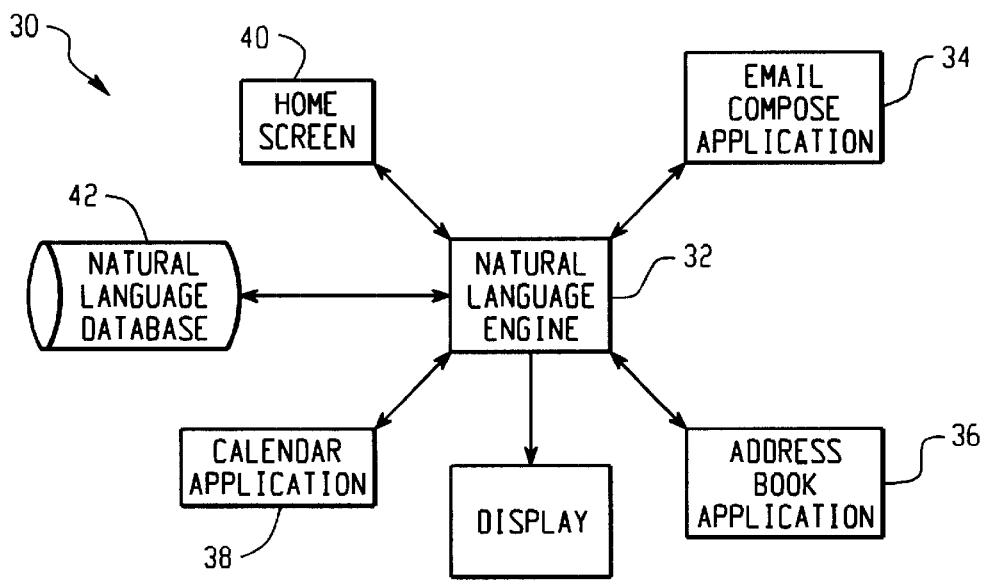
FIG. 2 is a block diagram showing exemplary components of a natural language user interface system according to the present invention.

Referring now to the figures, FIG. 2 is a block diagram showing exemplary components of a natural language user interface system 30 according to the present invention. This system 30 may include a natural language search engine 32, an email compose application 34, an address book application 36, a calendar application 38, a home screen 40, and a natural language database 42. The natural language search engine 32 is preferably a software module that interacts with the other software applications and databases in the system. Operationally, the natural language user interface system 30 connects all of the software applications 34, 36, 38 via the natural language database 42 and the natural language search engine 32. Preferably, the natural language search engine 32 may be accessed by a user from the home screen 40 or from within any software application 34, 36, and 38. In one possible embodiment, the user accesses the natural language search engine 32 by entering abbreviated textual commands in a graphical dialog box 44 that is available on the home screen 40 and is accessible in the software applications 34, 36, and 38. The text may be entered into the graphical dialog box 44 using a keypad, an auxiliary input device such as a thumbwheel, or any other known input device.

Figure 3:
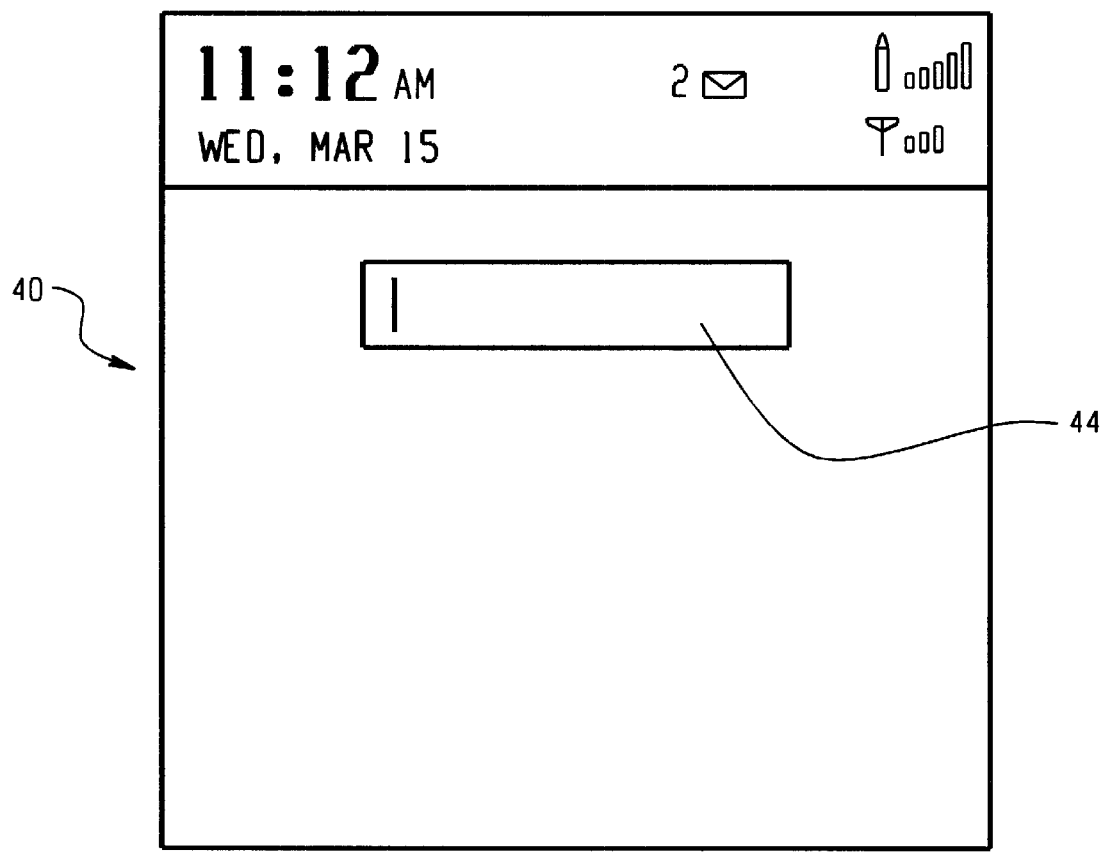
FIG. 3 shows an exemplary home screen, including an exemplary graphical dialog box.

FIG. 3 shows an exemplary home screen 40, including a graphical dialog box 44. Using the graphical dialog box 44, software applications 34, 36, and 38 may be quickly launched from any point within the system by entering a textual command, preferably in the form of an abbreviated textual command. For example, a user may wish to open the calendar application 38 while he or she is using the email compose application 34. To execute this operation, the user could access the graphical dialog box 44, and enter an abbreviated textual command associated with the calendar application, such as "c" for calendar or "app" for appointment. Referring again to FIG. 2, the natural language search engine 32 then compares the abbreviated textual command entered in the graphical dialog box 44 with a command list stored in the natural language database 42, and either executes the associated operation or presents the user with a list of possible commands.

Figure 4:
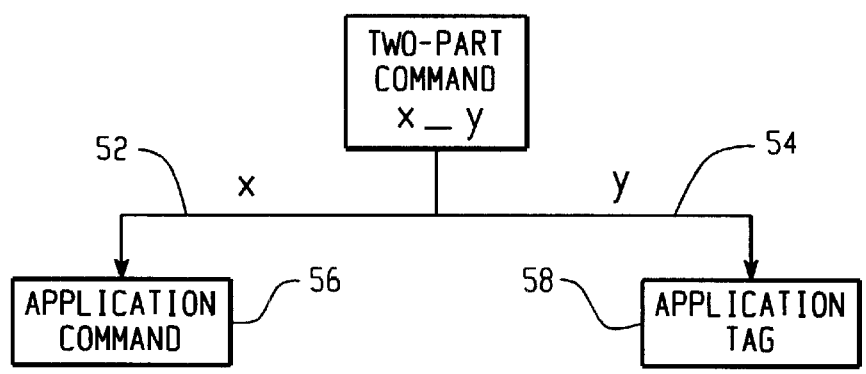
FIG. 4 shows an exemplary two-part abbreviated textual command.

FIG. 4 shows an exemplary two-part abbreviated textual command 50. The user enters the exemplary two-part abbreviated textual command 50 in the form of "x_y" (where "_" represents a space). The natural language search engine 32 relates the first input component 52 ("x") to a possible application command 56, and the second input component 54 ("y") to a possible application tag 58. An application command 56 refers to a discrete software application or sub-application in the system 30, such as the email compose application 34, address book application 36, or calendar application 38. An application tag 58 refers to data associated with the discrete software application or sub-application; for example, retrieving an individual's name stored in the address book application 36.

FIG. 5 is a table 60 illustrating exemplary application commands 56 and exemplary associated application tags 58. For example, possible application tags associated with the command "compose" could be names or email addresses that are stored in a database accessed by the email compose application 34.

Figure 6:
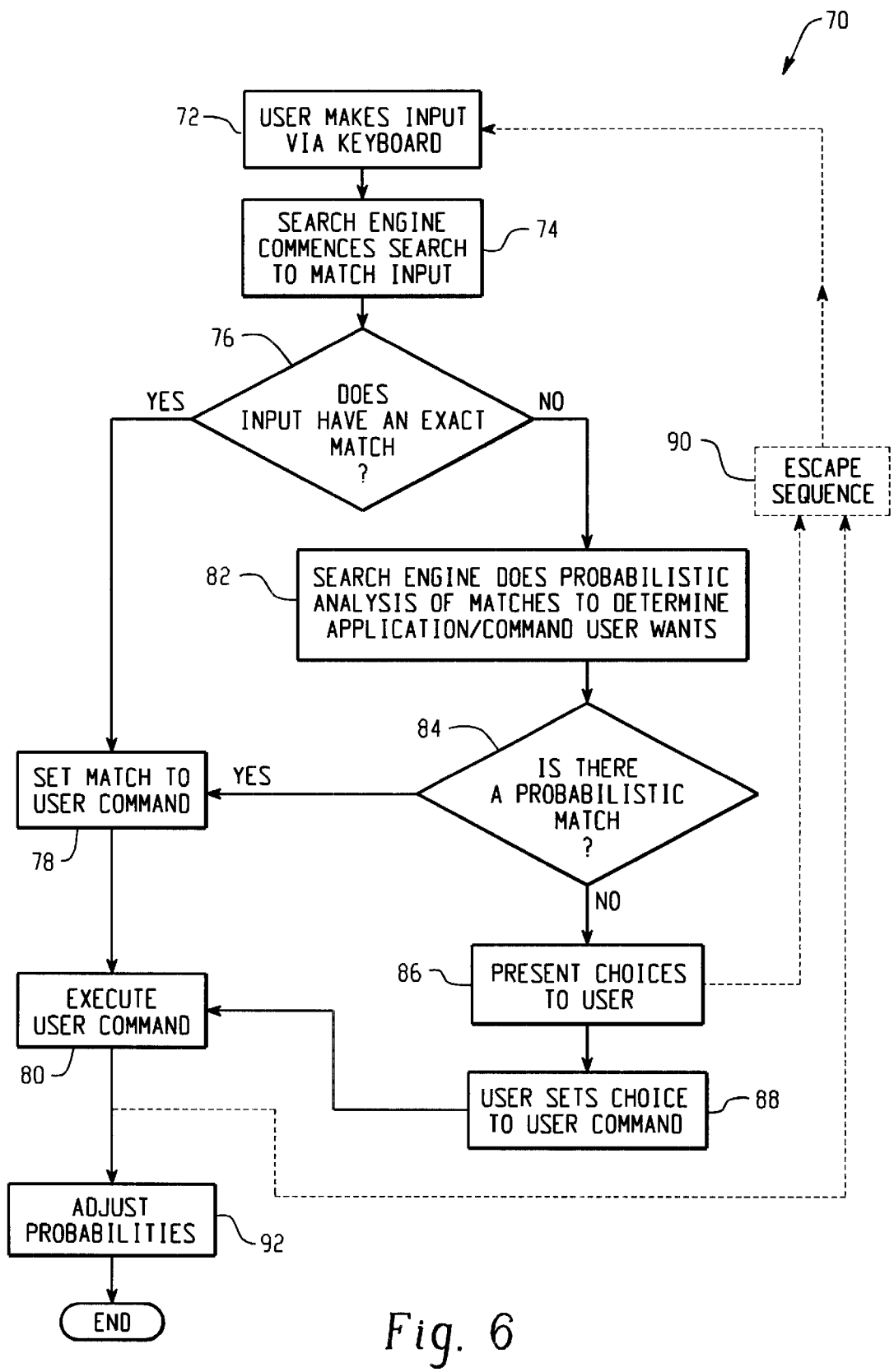
FIG. 6 is a flow diagram showing an exemplary method of matching an abbreviated textual command with a desired application command and application tag using a probability analysis.

FIG. 6 is a flow diagram 70 showing an exemplary method of matching an abbreviated textual command with a desired application command and application tag using a probability analysis. Using this method, the natural language search engine 32 interprets which application command 56 and application tag 58 (collectively referred to hereinafter as "user command") is likely desired by the user based on a historical probability. Where a user command has a high likelihood, the natural language search engine 32 will invoke that user command rather than expending processor resources searching for other alternatives.

In step 72, the user enters an input, preferably in the form of "x_y" as described above with respect to FIG. 4. In steps 74 and 76, the natural language search engine 32 attempts to associate the input with an exact match in a list of user commands stored in the natural language database 42.

FIG. 7 shows a exemplary data set 100 stored in the natural language database 42. This data set 100 includes a user input record 102, a user command record 104, and a probability factor record 106. The user input record 102 is a historical record of all of the abbreviated textual commands previously entered by the user. The user command record 104 includes a set of user commands associated with each abbreviated textual command, and the probability factor record 106 includes a probability factor associated with each user command. For example, the abbreviated textual command "e_j" has two associated user commands, "email john" and "email jane." The user command "email john" has a probability factor of 0.8, and the user command "email jane" has a probability factor of 0.2.

The probability factors are assigned by the natural language search engine 32 based on the number of times a user executes a given user command after entering a given abbreviated textual commend, and preferably the amount of time since the user command was last invoked. If, after a set number of entries, a user command has always been associated with the same user input, the user command has a probability factor of 1.0 and is an exact match. For example, if a user always enters "e_j" to execute the user command "email john," after a set number of entries this pair will be assigned a probability factor of 1.0 and will be considered an exact match.

Referring again to FIG. 6, an exact match in step 76 causes the natural language search engine 32 to execute the user command automatically at step 80 after setting the exact match to the user command at step 78. If the natural language search engine 32 finds more than one or no matches at step 76, however, then a probability analysis at steps 82 and 84 is undertaken to find a suitable match. The purpose of the probability analysis is to narrow the search results of step 76 to the user command most probably desired by the user. As a user configurable default, if any one of the results of step 76 has more than a 0.5 probability factor, then that result is a probabilistic match. The probabilistic match is then set to the user command at step 78, and executed in step 80.

If no probabilistic match can be determined in steps 82 and 84, however, then the natural language search engine 32 will display a list of possible commands to the user in step 86. In step 88, the user may select from the list of possible commands, or alternatively may narrow the list by entering more text. In a preferred embodiment, the list of possible commands displayed in step 86 is presented in a manner that allows the user to quickly select one of the choices. One such method is to present the command list to the user arranged according to the frequency of use as determined by the probability factor. In the event that a user enters text that does not match any user commands in the natural language database 42, the natural language search engine 32 will preferably present a list of generic commands that it is capable of executing. Alternatively, at step 86 the user is permitted to escape and return to step 72 to enter a different input by executing an escape sequence 90.

After a user command has been executed in step 80, the user may return to step 72 by pressing an escape key, or by some other suitable escape sequence 90. At step 92 the probability factor record 106 is adjusted appropriately to reflect the users actions.

In an alternative embodiment, the method for matching an abbreviated textual command to a desired user command utilizes set abbreviations assigned by the user based on his or her preferences. In this embodiment, the user may, at his or her option, associate abbreviations with user commands, preferably as part of a setup procedure for the natural language database or as a user option. For example, the user may chose "e" to always represent a command to launch the email composer application 34, or possibly "e_j" to always represent the user command "email jim." In this manner, only two keystrokes are required to invoke the email composer application 34, and select the addressee "jim." In the event that a user enters text that does not match any system commands or abbreviated commands set by the user, the natural language search engine 32 may return an error message and prompt the user to enter the input again, or show a list of possible command choices. The list of possible command choices may include the most recently entered user commands or a list of the generic commands that the natural language search engine 32 is capable of executing. Upon selecting a user command, the user will preferably have the option of assigning his textual input as a new abbreviated command.

In a further embodiment of the present invention, a list of frequently used commands is displayed by the natural language search engine 32 as soon as the user begins entering text in the graphical dialog box 42. The user then has the option to continue typing or choose from the list of commands.

In another embodiment of the present invention, the user is able to create short cut keys associated with a desired user command. In this embodiment, the natural language search engine 32 enables a user to associate key strokes with a user command within the natural language database 42.

Figure 1:
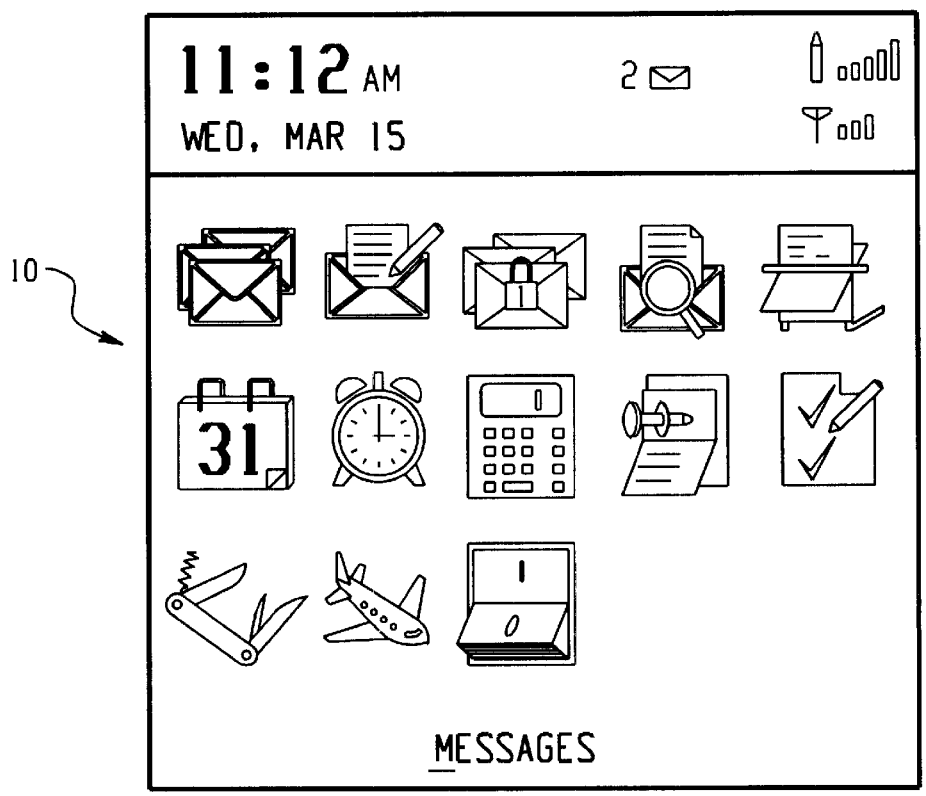
FIG. 1 is a known graphical user interface.
Figure 8:
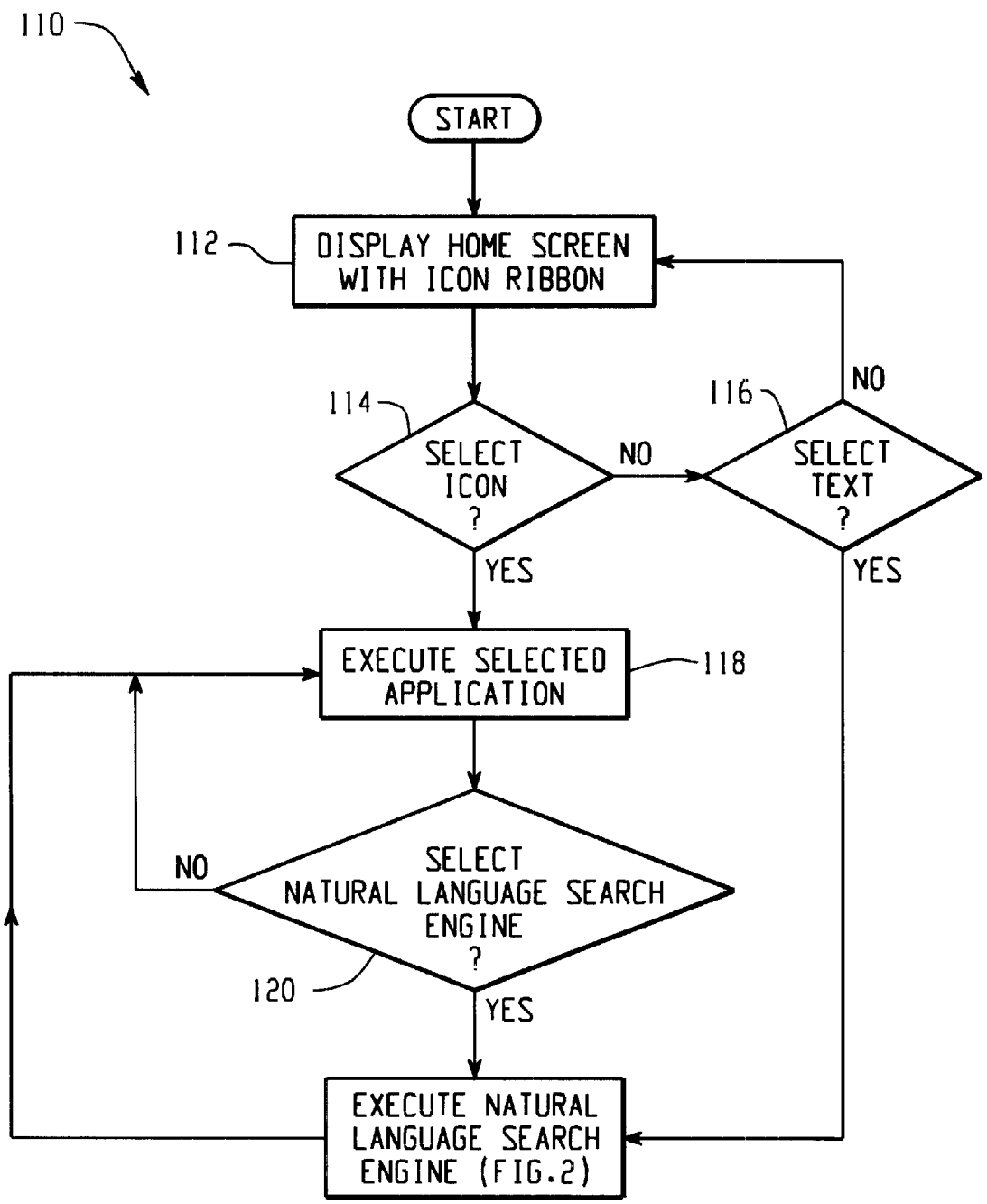
FIG. 8 is a flow diagram representing an exemplary user interface having both an icon ribbon and a natural language interface.

FIG. 8 is a flow diagram 110 representing an exemplary user interface having both an icon ribbon and a natural language interface. In this embodiment, the home screen includes an icon ribbon, such as the icon ribbon in the known graphical interface 10 shown in FIG. 1. While in the home screen at step 112, the user has the option of selecting an icon in step 114, or activating the natural language search engine 32 by entering text in step 116. Preferably, a graphical dialog box 44 is opened by the natural language search engine 32 as soon as the user begins entering text. Alternatively, the natural language search engine 32 may be activated by some other means; for example by selecting a hot key or designated key combination, or, possibly, by selecting a designated icon.

In this embodiment, an application may be executed in step 118 by either the icon ribbon or the natural language search engine 32. Once an application is launched, the user has the option in step 120 to launch a different application as described above with respect to FIGS. 2 and 3. For example, a user may launch the email compose application 34 in step 114 by either selecting the appropriate icon or entering a command using the natural search engine 32.

Once the email compose application 34 has been executed in step 118, the user may then wish to launch the address book application 36 without first exiting back to the home screen. In step 120, the user has the option of launching the address book application 36 by activating the natural language search engine 32 from within the email compose application 34.

The invention has been described with reference to the preferred embodiments. Those skilled in the art will consider improvements, changes and modifications in view of the foregoing description. Such improvements, changes and modifications are intended to be within the scope of the claims.

We claim:

1. A method of launching a software application, comprising the steps of:
   entering an abbreviated textual command into a hand-held device;
   receiving the abbreviated textual command in a natural language search engine;
   searching a natural language database that contains a historical log of previously entered abbreviated textual commands and their associated application commands;
   analyzing the historical log to determine if the abbreviated textual command has previously been associated with a probable application command more than a set percentage of the time, and if so, setting the probably application command as a desired application command; and
   executing the desired application command.

2. The method of claim 1, comprising the additional step of:
   manually entering the desired application command if the analysis of the historical log establishes that the abbreviated textual command has not previously been associated with a probable application command more than a set percentage of the time.

3. A method of executing software commands in a hand-held device, comprising the steps of:
   entering an abbreviated textual command;
   searching a natural language database that stores a data set of abbreviated textual commands and associated application commands to determine if the abbreviated textual command has an exact match in the data set;
   if the abbreviated textual command has an exact match in the data set, then setting the exact match as a user command;
   if the abbreviated textual command does not have an exact match in the data set, then analyzing a user's historical preferences to determine if the abbreviated textual command has a probable match in the data set;
   if the abbreviated textual command has a probable match in the data set, then setting the probable match as the user command;
   if the abbreviated textual command does not have a probable match in the data set, then presenting a list of possible commands to the user, receiving a command choice from the user, and setting the command choice as the user command; and
   executing the user command.

4. The method of claim 3, wherein the step of analyzing a user's historical preferences is performed using a set of probability factors that are generated based on the user's historical preferences, where the abbreviated textual command has a probable match in the data set when the probability factor associated with the probable match is greater than a predetermined value.

5. The method of claim 3, wherein the predetermined value is defined by the user.

6. The method of claim 3, comprising the additional step of:
   adjusting the set of probability factors each time an abbreviated textual command is entered into the hand-held device.

7. The method of claim 3, wherein the list of possible commands presented if the abbreviated textual command does not have a probable match in the data set comprises a set of recently executed application commands.

8. The method of claim 3, wherein the list of possible commands presented if the abbreviated textual command does not have a probable match in the data set comprises a set of generic application commands that the natural language search engine is capable of executing.

9. The method of claim 3, wherein
   the abbreviated textual command has a first component and a second component where the first component represents a desired application command, and the second component represents a desired application tag; and
   the natural language database stores a data set of abbreviated textual command and their associated application commands and tags.

10. An interface system, comprising:
    a plurality of software applications;
    means for entering text; and
    a natural language search engine configured to receive an abbreviated textual command from the text entering means, match the abbreviated textual command with a desired application command, and launch one of the software applications by executing the desired application command;
    wherein the natural language search engine is configured to perform the steps of:
      receiving a two-part abbreviated textual command from the text entering means having a first component and a second component;
      matching the first component with a desired application command;
      matching the second component with a desired application tag;
      launching one of the software applications by executing the desired application command; and
      retrieving data associated with the application command using the desired application tag.

11. The interface system of claim 10, wherein the text entering means includes a graphical dialog box.

12. The interface system of claim 10, wherein the natural language search engine can receive abbreviated textual commands while any of the software applications are executing.

13. The interface system of claim 10, further comprising:
    a home screen that is a graphical interface between a user and the natural language search engine.

14. The interface system of claim 13, wherein the home screen includes an icon ribbon having a plurality of icons, and wherein a user may launch one of the software applications by either selecting one of the icons or entering an abbreviated textual command.

15. The interface system of claim 10, wherein the natural language search engine is operative to match the abbreviated textual command with the desired application command by presenting a user with a list of likely command choices.

16. The interface system of claim 15, wherein the software applications are executed on a hand-held device.

17. An interface system, comprising:

a plurality of software applications;

means for entering text; and a natural language search engine configured to receive an abbreviated textual command from the text entering means, match the abbreviated textual command with a desired application command, and launch one of the software applications by executing the desired application command;

wherein the natural language search engine is operative to match the abbreviated textual command with the desired application command using a probability factor that is generated by the natural language search engine based on a user's historical preferences.

18. The interface system of claim 17, wherein the text entering means includes a graphical dialog box.

19. The interface system of claim 17, wherein the natural language search engine can receive abbreviated textual commands while any of the software applications are executing.

20. The interface system of claim 17, further comprising:

a home screen that is a graphical interface between a user and the natural language search engine.

21. The interface system of claim 20, wherein the home screen includes an icon ribbon having a plurality of icons, and wherein a user may launch one of the software applications by either selecting one of the icons or entering an abbreviated textual command.

22. The interface system of claim 11, wherein the natural language search engine is operative to match the abbreviated textual command with the desired application command by presenting a user with a list of likely command choices.

23. The interface system of claim 22, wherein the software applications are executed on a hand-held device.

24. An interface system, comprising:

a plurality of software applications;

means for entering text;

a natural language search engine configured to receive an abbreviated textual command from the text entering means, match the abbreviated textual command with a desired application command, and launch one of the software applications by executing the desired application command; and a natural language database configured to store a data set of abbreviated textual commands and their associated application commands, and that is used by the natural language search engine to match the abbreviated textual command with the desired application command;

wherein the data set includes probability factors that represent the probability that an application command is desired by a user when a corresponding abbreviated textual command is entered.

25. The interface system of claim 24, wherein the data set is defined by a user.

26. The interface system of claim 24, wherein the data set includes application tags associated with abbreviated textual commands.

27. The interface system of claim 24, wherein the text entering means includes a graphical dialog box.

28. The interface system of claim 24, wherein the natural language search engine can receive abbreviated textual commands while any of the software applications are executing.

29. The interface system of claim 24, further comprising:

a home screen that is a graphical interface between a user and the natural language search engine.

30. The interface system of claim 29, wherein the home screen includes an icon ribbon having a plurality of icons, and wherein a user may launch one of the software applications by either selecting one of the icons or entering an abbreviated textual command.

31. The interface system of claim 24, wherein the natural language search engine is operative to match the abbreviated textual command with the desired application command by presenting a user with a list of likely command choices.

32. The interface system of claim 31, wherein the software applications are executed on a hand-held device.

33. The interface system of claim 27, wherein the data set comprises:

a user input record that includes a set of abbreviated textual commands which have been received by the natural language search engine;

a user command record that includes a set of application command an tags, wherein at least one application command and tag correspond to each entry in the set of abbreviated textual commands; and a probability factor record that includes a set of probability factors that are generated by the natural language search engine based on a user's historical preferences, and represent the probability that an application command and tag is desired by the user when a corresponding abbreviated textual command is entered.

34. An interface system for a hand-held device, comprising:

a plurality of software applications;

a home screen;

means for entering text that can be accessed by a user either from the home screen or while any of the software applications are executing;

a natural language database that stores a data set of abbreviated textual commands and associated application commands; and a natural language search engine configured to receive an abbreviated textual command from the text entering means, to match the abbreviated textual command with a desired application command using the natural language database, and to launch one of the software applications by executing the desired application command;

wherein the natural language database also includes a set of probability factors associated with each application command; and wherein the natural language search engine uses the set of probability factors to match the abbreviated textual command with the desired application command.

35. The interface system of claim 34, wherein the text entering means includes a dialog box.

36. The interface system of claim 34, wherein the home screen includes an icon ribbon having a plurality of icons, wherein the user may launch one of the software applications by selecting one of the icons.

37. The interface system of claim 34, wherein the set of probability factors are generated by the natural language search engine based on the user's historical preferences.

38. The interface system of claim 34, wherein the hand-held device is a PDA.

39. The interface system of claim 34, wherein the hand-held device is a cellular telephone.

40. The interface system of claim 34, wherein the hand-held device is a two-way pager.

41. The interface system of claim 34, wherein the software applications include an email compose application.

42. The interface system of claim 34, wherein the software applications include an address book application.

43. The interface system of claim 34, wherein the software applications include a calendar application.

44. A hand-held device, comprising:
- a processing sub-system;
- a memory sub-system;
- a plurality of software applications stored in the memory sub-system and executable by the processing sub-system;
- a user interface for inputting text; and
- a natural language search engine executed by the processing sub-system and operable to receive an abbreviated textual command from the user interface, match the abbreviated textual command with a desired application command using a probability factor that is generated based on a user's historical preferences, and launch one of the software applications by executing the desired application command.

45. The hand-held device of claim 44, wherein the user interface includes a graphical dialog box.

46. The hand-held device of claim 44, wherein the natural language search engine is operable to receive abbreviated textual commands while any of the software applications are executing.

47. The hand-held device of claim 44, wherein the user interface includes a home screen that provides a graphical interface between a user and the natural language search engine.

48. The hand-held device of interface system of claim 47, wherein the home screen includes an icon ribbon having a plurality of icons, and wherein a user may launch one of the software applications by either selecting one of the icons or entering an abbreviated textual command.

49. The hand-held device of claim 44, wherein the natural language search engine is operable to match the abbreviated textual command with the desired application command by presenting a user with a list of likely command choices.

* * * * *

UNITED STATES PATENT AND TRADEMARK OFFICE
CERTIFICATE OF CORRECTION

PATENT NO.    : 6,691,111 B2
DATED         : February 10, 2004
INVENTOR(S)   : Mihal Lazaridis and Michael Brown It is certified that error appears in the above-identified patent and that said Letters Patent is hereby corrected as shown below:

Column 7,
Line 32, please replace "claim 11" with -- claim 17 --

Column 8,
Line 15, please replace "claim 27" with -- claim 24 --

Signed and Sealed this

Fifteenth Day of June, 2004

JON W. DUDAS
*Acting Director of the United States Patent and Trademark Office*